Nov. 27, 1923.
E. CHRISTENSEN
AUTO SPONGE SPRAY
Filed Oct. 18, 1921
1,475,748
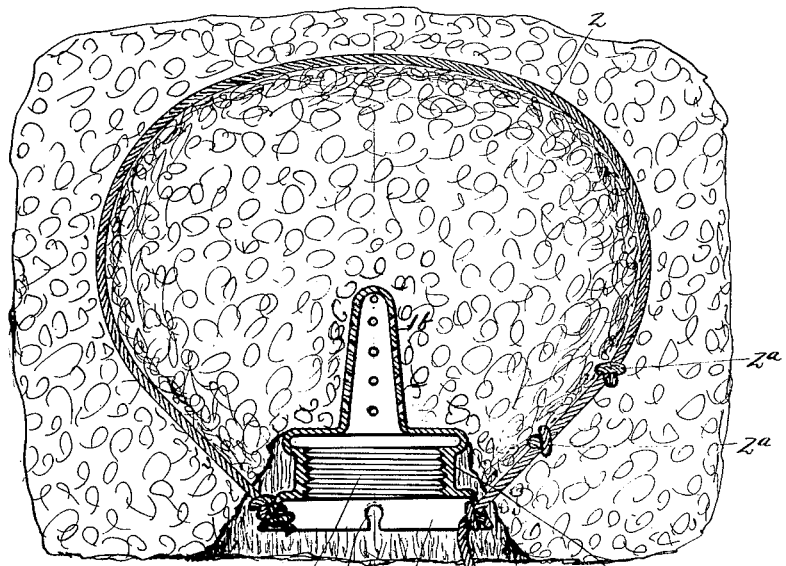
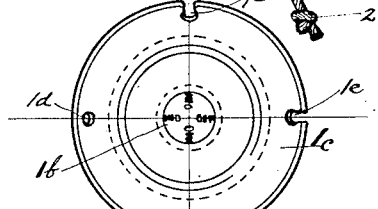
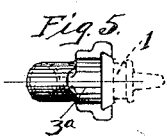
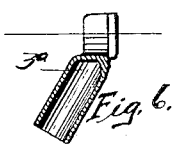
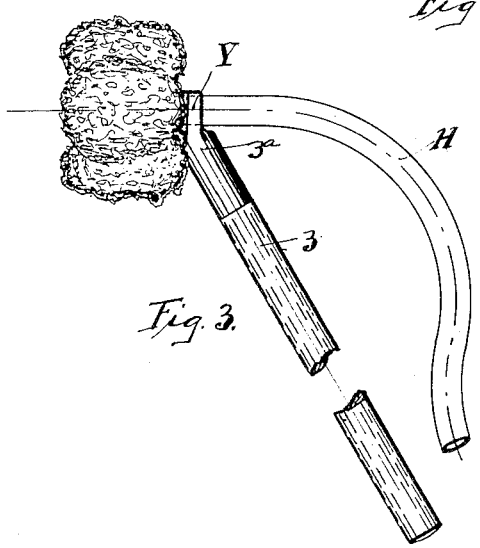
Inventor
EMIL CHRISTENSEN,
By Patented Nov. 27, 1923.

1,475,748

UNITED STATES PATENT OFFICE.

EMIL CHRISTENSEN, OF PORTLAND, OREGON.

AUTO SPONGE SPRAY.

Application filed October 18, 1921. Serial No. 508,553.

*To all whom it may concern:*

Be it known that I, EMIL CHRISTENSEN, a citizen of the United States, residing in the city of Portland, county of Multnomah, and State of Oregon, have invented certain new and useful Improvements in Auto Sponge Sprays, of which the following is a specification.

My invention has for its principal object to provide a simple, practical and inexpensive device which can be attached to a hose and to which can be quickly attached a sponge or other cleaning article into which water or cleaning fluid will be discharged from said hose, with means whereby a handle can be easily and quickly attached for using said sponge on an object to be cleaned while the water is being discharged therethrough.

In order to clearly explain my invention, I have shown a practical embodiment thereof on the accompanying drawings, in which, Figure 1 is a sectional view through the device, showing a spong attached thereto;

Figure 2 is a bottom plan view of the device without the sponge;

Figure 3 is a side elevation of the complete device with handle and hose attached;

Figures 4, 5 and 6 are detailed views of the upper end of a handle.

Referring more in detail to the drawings illustrating one embodiment of my invention, a spray head, 1, is provided having an internally threaded part, $1^a$, to receive a hose connection. Said head also has an extension, $1^b$, with perforations for the discharge of water. The lower side of said head is provided with a flange, $1^c$, provided in the present showing with two attaching holes, $1^d$, $1^d$, and with two attaching slots, $1^e$, $1^e$. Attaching cords, as 2, are provided, having their ends attached to the attaching holes, $1^d$, $1^d$, and being provided with knots, as $2^a$, whereby said cord can be anchored in the attaching slots, $1^e$, $1^e$, as clearly shown in Fig. 1. A hose H for supplying water or other fluid, can be attached to said head, as indicated in Fig. 3. A handle 3 is provided at one end, with a fork or Y, $3^a$, adapted to receive the spray head 1, around the outside of the threaded portion thereof, and as indicated in dotted lines in Fig. 5.

Thus I have provided a most simple and practical device which can be used with a handle and hose for washing and rinsing automobiles, windows and other articles, and which can also be used in the hand, attached to a hose, without the handle, if desired, the water or washing fluid being discharged through the spong as required.

I do not limit the invention to the exact details shown, except as I may be limited by the hereto appended claims.

I claim:

1. A device of the character referred to comprising a head threaded to be attached to a water hose and having an integral extension centrally thereof perforated through its side, and having at its attached end a flange portion with openings therein, a flexible element attached at one end to said device and adapted to have its opposite end detachably held in one of said openings at different positions at will, and a washing element adapted to be placed around the extension part of said head and to be detachably held in place by said flexible element when the latter is secured in the openings in said flange portion, substantially as described.

2. A device of the character referred to comprising a head having a perforated extension and having a flange portion, and threaded to receive a water hose, a washing element adapted to be placed around said extension, a flexible cord attached at one end to one side of said flange portion and passed around said washing element and detachably secured to the other side of said flange portion, and a handle having a fork adapted to detachably receive and hold said head, substantially as described.

Signed at Portland, Multnomah County, Oregon, this 6th day of October, 1921.

EMIL CHRISTENSEN.

Witnesses:
I. M. GRIFFIN,
J. P. BENNETT.